US012747980B2

(12) United States Patent
Lee

(10) Patent No.: US 12,747,980 B2
(45) Date of Patent: Sep. 29, 2026

(54) SYSTEM AND METHOD FOR DETECTING FIRE EVENT IN UNDERGROUND UTILITY TUNNELS BASED ON ACOUSTICS

(71) Applicant: ELECTRONICS AND TELECOMMUNICATIONS RESEARCH INSTITUTE, Daejeon (KR)

(72) Inventor: Byung Jin Lee, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 175 days.

(21) Appl. No.: 18/637,982

(22) Filed: Apr. 17, 2024

(65) Prior Publication Data

US 2025/0012625 A1 Jan. 9, 2025

(30) Foreign Application Priority Data

Jul. 7, 2023 (KR) ........................ 10-2023-0088371
Jan. 3, 2024 (KR) ........................ 10-2024-0000860

(51) Int. Cl.
*G01H 17/00* (2006.01)
*G01D 21/00* (2006.01)
*G06F 3/16* (2006.01)
*H01T 14/00* (2006.01)

(52) U.S. Cl.
CPC ............. *G01H 17/00* (2013.01); *G06F 3/162* (2013.01); *G01D 21/00* (2013.01); *H01T 14/00* (2013.01); *H04R 2499/00* (2013.01)

(58) Field of Classification Search
CPC ................................ G01H 17/00; G06F 3/162
See application file for complete search history.

(56) References Cited

U.S. PATENT DOCUMENTS

2017/0019199 A1* 1/2017 Matsch ................. G06F 16/638
2017/0363677 A1* 12/2017 Chernyshov ............ H01T 13/58
2021/0281061 A1 9/2021 Song et al.
2022/0167142 A1 5/2022 Myong et al.
2022/0172596 A1 6/2022 Oh et al.
2023/0132125 A1* 4/2023 Moon ................... G10L 19/167 381/77
2023/0368651 A1* 11/2023 Cho ..................... G08B 29/188
(Continued)

FOREIGN PATENT DOCUMENTS

KR 10-1389844 B1 5/2014
KR 10-2019-0061425 A 6/2019
(Continued)

OTHER PUBLICATIONS

Byung-Jin Lee et al., "Acoustic Based Fire Event Detection System in Underground Utility Tunnels", Fire, May 20, 2023, 6, 211, pp. 1-16.

*Primary Examiner* — Matthew A Eason
(74) *Attorney, Agent, or Firm* — Rabin & Berdo, P.C.

(57) ABSTRACT

Provided are a system and a method for detecting fire event in underground utility tunnels based on acoustics. The system is for early detection of fire situations in an underground facility based on sound. The system includes a sound acquisition device that is installed in the underground facility and collects acoustic signals in real time, and a fire situation early detection server that predicts occurrence of electric sparks and infers a fire risk based on the acoustic signal collected by the sound acquisition device.

14 Claims, 11 Drawing Sheets

(56) References Cited

U.S. PATENT DOCUMENTS

| | | | | |
|---|---|---|---|---|
| 2023/0409897 | A1 * | 12/2023 | Wang | G06N 3/08 |
| 2024/0196045 | A1 * | 6/2024 | Kozuka | G06Q 30/0643 |
| 2024/0304203 | A1 * | 9/2024 | Joshi | G10L 25/51 |
| 2025/0175528 | A1 * | 5/2025 | Thomsen | G01D 21/02 |

FOREIGN PATENT DOCUMENTS

| | | | |
|---|---|---|---|
| KR | 10-2188561 | B1 | 12/2020 |
| KR | 10-2022-0020001 | A | 2/2022 |
| KR | 102395518 | B1 | 5/2022 |
| KR | 10-2022-0105039 | A | 7/2022 |
| KR | 102471911 | B1 | 11/2022 |
| KR | 10-2023-0005626 | A | 1/2023 |
| WO | 2020/111510 | A1 | 6/2020 |
| WO | 2022/071756 | A1 | 4/2022 |

* cited by examiner

SYSTEM AND METHOD FOR DETECTING FIRE EVENT IN UNDERGROUND UTILITY TUNNELS BASED ON ACOUSTICS

CROSS-REFERENCE TO RELATED APPLICATIONS

This application is based on, and claims priority to, Korean Patent Application Numbers 10-2023-0088371, filed on Jul. 7, 2023 and 10-2024-0000860, filed on Jan. 3, 2024, the disclosure of which is incorporated by reference herein in its entirety.

TECHNICAL FIELD

The present disclosure relates to a sound-based underground facility fire situation detection system and method

BACKGROUND

The contents described below merely provide background information related to the present disclosure and do not constitute prior art.

An underground utility tunnel (UUT) is an infrastructure facility that jointly accommodates two or more types of underground facilities, such as supply facilities for electricity, gas, and water, communication facilities, and sewage facilities. Among the underground utility tunnels installed in various regions, underground facilities that have been in use for more than 30 or 20 years account for 25% and 43%, respectively. Many underground facilities are expected to deteriorate, and effective management of underground facilities and fire safety prevention measures are important due to the increase in fire safety-related disasters. Since underground facilities have a corridor-type structure and response time is limited in the event of a disaster such as a fire, it is important to comprehend and predict abnormal situations before a disaster occurs to prevent disasters.

Conventional technologies to prevent disasters in underground facilities include systems that check for abnormalities in facilities and installed equipment based on CCTV images or data from various sensors (optical sensors, vibration sensors, etc.). However, the technology using CCTV images has limitations in analyzing abnormal situations since the quality of CCTV images may deteriorate due to limited lighting due to the nature of underground spaces, resulting in the low recognition rate. In addition, depending on the situation of the underground space, the placement and installation location of CCTV may be limited, resulting in blind spots and limitations in analysis. In the case of optical sensors, they are made of flexible and thin materials, so environmental influences, such as high humidity, dust, and vibration which are common in underground spaces, may damage the optical fibers and affect sensor operation, resulting in poor performance. In the case of vibration sensors, in the underground environment, vibrations caused by various factors such as vibration of structures, movement of human and machines in underground, underground heat, and earthquakes act in combination, which may distort the vibration or cause noise in the sensor, and changes in the underground environment such as humidity, temperature, etc. may affect the measurement results.

In order to solve the limitations of the above-described conventional technologies, there is a need for an early detection system for fire situations in underground facilities based on acoustic sensors that are relatively easy to install and capable of widespread monitoring. Since acoustic sensors are not contact-type like vibration sensors or optical sensors, they can be used more efficiently by installing them in vulnerable areas where condensation occurs. Further, the acoustic sensors do not interact with or interfere with other devices or equipment installed inside underground facilities, and they can be managed safely.

However, vibration, mechanical noise, water pressure, etc. around underground structures may act as complex factors that distort sound or cause noise. Since the noise distorts the signal and reduces the accuracy of sound-based abnormal situation detection, there is a need for technologies to predict abnormal situations in an environment with a low signal-to-noise ratio (SNR), and it is necessary to infer the corresponding risk and support on-site decision-making to respond in advance before a disaster occurs.

SUMMARY

Embodiments of the present disclosure provide a method and system for detecting abnormal situations based on sound before a fire occurs using acoustic sensors installed in underground facilities where fire safety attention is required, inferring the corresponding risk, and supporting on-site decision-making to response in advance before a fire occurs.

The purposes of the present disclosure are not limited to those mentioned above, and other purposes not mentioned will be clearly understood by those skilled in the art through the following description.

According to at least one embodiment, the present disclosure provides a system for early detection of fire situations in an underground facility based on sound. The proposed system includes a sound acquisition device that is installed in the underground facility and collects acoustic signals in real time, and a fire situation early detection server that predicts occurrence of electric sparks and infers a fire risk based on the acoustic signal collected by the sound acquisition device.

The fire situation early detection server may include an audio receiving unit configured to receive the acoustic signals collected from the sound acquisition device, a preprocessing unit configured to divide the received acoustic signals into a plurality of frames and obtain a spectrogram for each of the plurality of frames, a fire sound analysis unit configured to extract noise-removed data from the obtained spectrogram, a pre-fire situation detection unit configured to predict a probability of electric spark occurrence based on the extracted data, and a fire risk inference unit configured to infer the fire risk by combining the predicted probabilities of electric spark occurrence in each frame.

The sound acquisition device may include an audio acquisition unit configured to collect acoustic signals in real time through an acoustic sensor including a microphone, an audio compression unit configured to compress the collected acoustic signals, and an audio transmission unit configured to transmit the compressed acoustic signals to the fire situation early detection server.

According to another embodiment, the present disclosure provides a method for early detection of fire situations in an underground facility based on sound. The method includes collecting, by at least one sound acquisition device installed in an underground facility, acoustic signals in real time, and transmitting the collected acoustic signals to a fire situation early detection server; dividing, by the fire situation early detection server, the received acoustic signals into a plurality of frames, and obtaining a spectrogram for each of the plurality of frames; extracting, by the fire situation early detection server, data from which noise has been removed from the spectrogram for each of the plurality of frames; predicting, by the fire situation early detection server, a probability of electric spark occurrence based on the extracted data; and inferring, by the fire situation early detection server, a fire risk by combining the predicted probabilities of electric spark occurrence in each frame.

According to one embodiment of the present disclosure, it is possible to detect an electric spark event in underground facilities in a high-noise environment to infer the risk for fire safety accidents, and to support on-site decision-making according to the risk inference results to prepare for and prevent fire safety accidents in advance, thereby providing timely information to actively respond to disasters to minimize fire safety damage.

The effects of the present disclosure are not limited to the effects mentioned above, and other effects not mentioned will be clearly understood by those skilled in the art from the description below.

DETAILED DESCRIPTION

Figure 1:
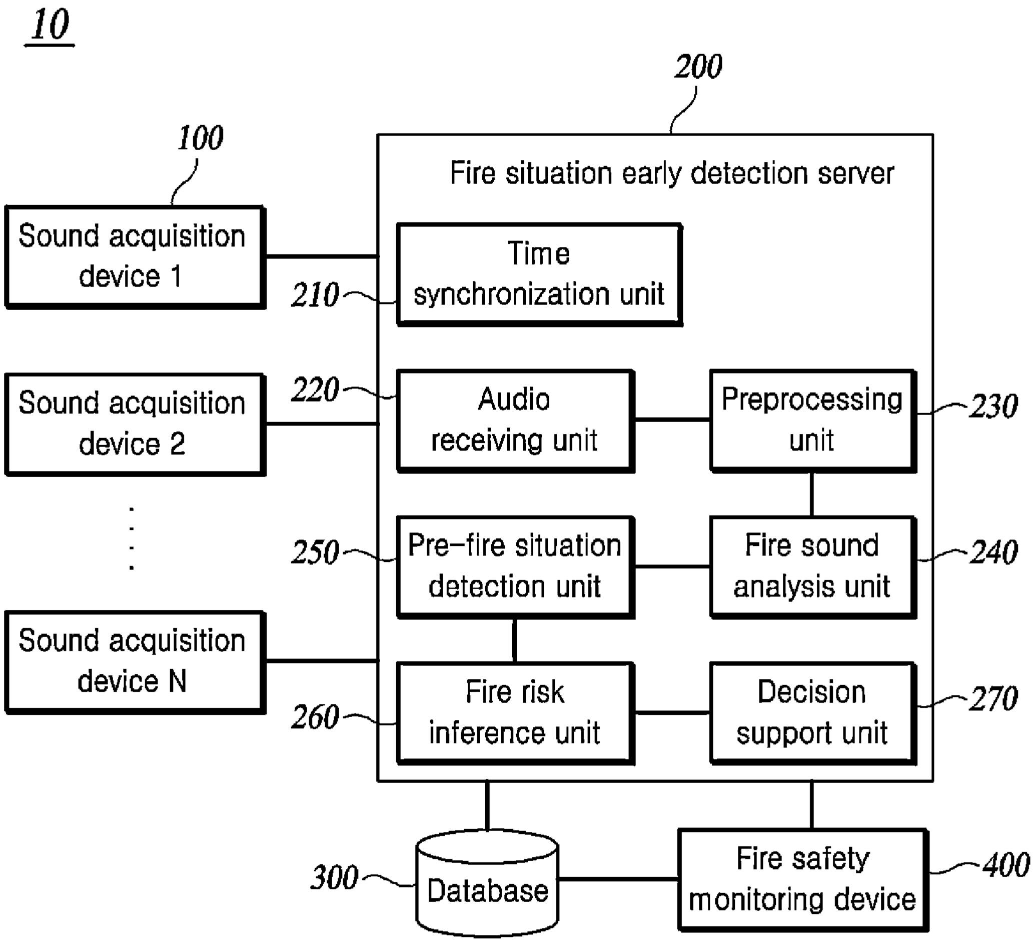
FIG. 1 is a block diagram of a sound-based underground facility fire situation detection system according to one embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

The present disclosure relates to a method and system for analyzing the sound generated in an underground utility tunnel, detecting the occurrence of electric sparks based on the analyzed sound to derive a predicted probability of fire occurrence, inferring a fire risk according to the predicted probability of fire occurrence, and supporting on-site decision-making based on the fire risk. The present disclosure proposes a technology for more accurately predicting abnormal situations before a fire occurrence based on sounds even in a high-noise environment with a low signal-to-noise ratio (SNR).

FIG. 1 is a block diagram of a sound-based underground facility fire situation detection system 10 according to one embodiment of the present disclosure.

Referring to FIG. 1, the sound-based underground facility fire situation detection system 10 includes all or part of one or more sound acquisition devices 100, a fire situation early detection server 200, a database 300, and a fire safety monitoring device 400.

The sound acquisition device 100 may be installed in one or more places where fire safety precautions are required due to condensation, corrosion, etc. in underground facilities. The sound acquisition device 100 detects sound in real time at the installed location, generates an acoustic signal, and transmits the generated acoustic signal to the fire situation early detection server 200.

Figure 2:
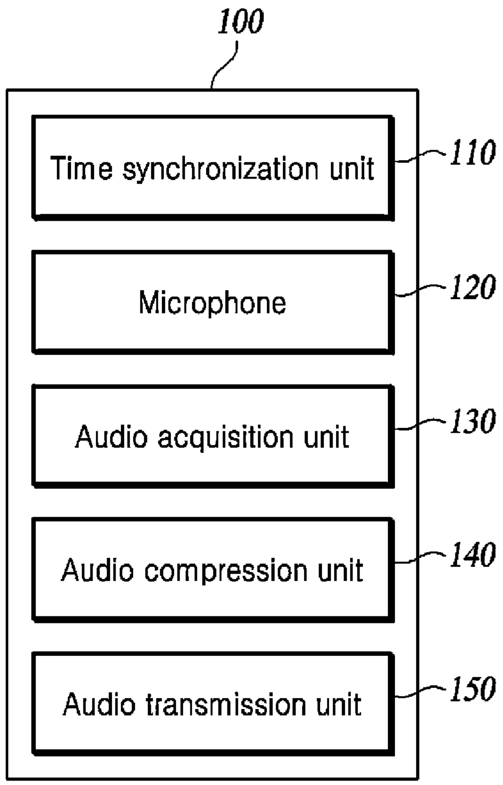
FIG. 2 is a block diagram of a sound acquisition device according to one embodiment of the present disclosure.

For this purpose, the sound acquisition device 100 includes a time synchronization unit 110, a microphone 120, an audio acquisition unit 130, an audio compression unit 140, and an audio transmission unit 150. FIG. 2 shows a block diagram of the sound acquisition device 100 according to an embodiment of the present disclosure.

The time synchronization unit 110 performs time synchronization with the fire situation early detection server 200. This is to simultaneously analyze acoustic signals collected by one or more sound acquisition devices 100. For example, the time synchronization unit 110 may synchronize time with the fire situation early detection server 200 using protocols such as NTP (Network Time Protocol), PTP (Precision Time Protocol) or the like. In this case, the time synchronization unit 110 of the sound acquisition device 100 operates as an NTP client or a PTP client, and a time synchronization unit 210 of the fire situation early detection server 200 operates as an NTP server or a PTP server.

Figure 3:
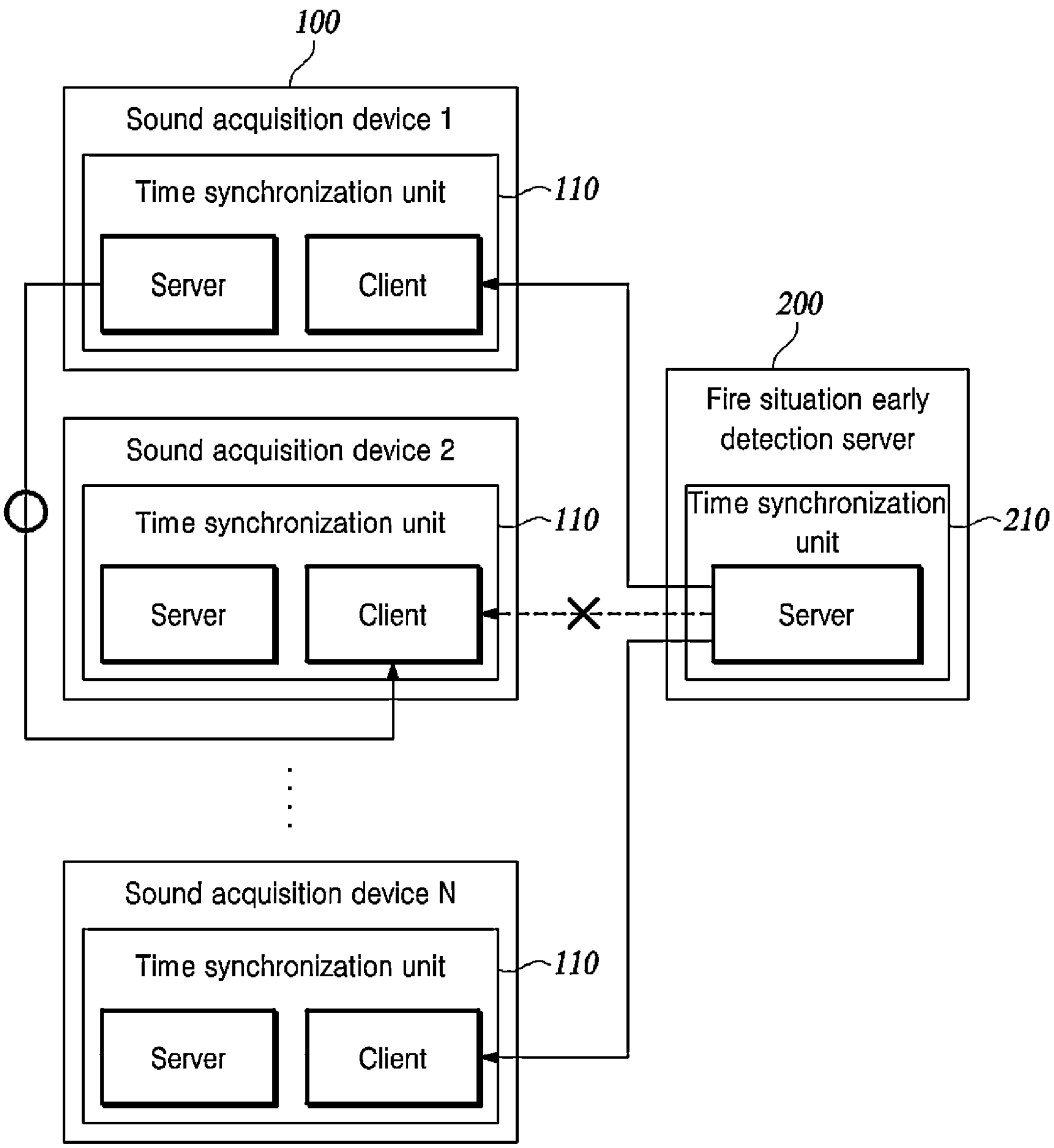
FIG. 3 illustrates a process in which when the sound acquisition device according to one embodiment of the present disclosure fails to synchronize time with a fire situation early detection server, the sound acquisition device performs time synchronization with another sound acquisition device.

When the sound acquisition device 100 fails to synchronize time with the fire situation early detection server 200, the sound acquisition device 100 may perform time synchronization with another sound acquisition device connected to the same network. In this case, another sound acquisition device may operate as an NTP server or a PTP server, and the sound acquisition device that failed time synchronization may operate as an NTP client or a PTP client. FIG. 3 shows an example of the process in which when the sound acquisition device 100 according to one embodiment of the present disclosure fails to synchronize time with the fire situation early detection server, the sound acquisition device 100 performs time synchronization with another sound acquisition device.

According to various embodiments of the present disclosure, the time synchronization unit 110 may perform time synchronization with a separate NTP server (not shown) or a PTP server (not shown).

The microphone 120 converts acoustic energy, or sound, into electrical energy. The microphone 120 may include an ultra-small microphone with a MEMS (Micro-Electro Mechanical Systems) structure, but is not limited thereto.

The audio acquisition unit 130 collects acoustic signals through a microphone. In this case, the collected acoustic signal refers to a digital signal and may be a pulse-code modulation (PCM) signal, but is not limited thereto.

The audio compression unit 140 performs compression of the collected acoustic signals to reduce the amount of data to be transmitted. For example, acoustic signals may be encoded using advanced audio coding (AAC), but the present disclosure is not limited thereto.

The audio transmission unit 150 transmits the compressed acoustic signals to the fire situation early detection server 200. The audio transmission unit 150 may transmit the compressed acoustic signals using a real-time transport protocol (RTP). For example, an RTP packet may be formed by attaching an RTP header and a timestamp to an AAC frame, and the RTP packet may be transmitted to the fire situation early detection server 200 using a user datagram protocol (UDP).

The sound acquisition device 100 may be designed to suit the environment of an underground utility tunnel. For example, the sound acquisition device 100 may be designed to enable power and data transmission through a single Ethernet cable using a PoE (Power over Ethernet) switch. The sound acquisition device 100 may be waterproofed to IP (Ingress Protection) 67 or higher to prevent abnormalities due to condensation while collecting sound.

The fire situation early detection server 200 detects abnormal situations based on acoustic signals received from one or more sound acquisition devices 100, infers the corresponding risk, and generates information that can support on-site decision-making to respond in advance before a fire occurs.

For this purpose, the fire situation early detection server 200 includes a time synchronization unit 210, an audio receiving unit 220, a preprocessing unit 230, a fire sound analysis unit 240, a pre-fire situation detection unit 250, a fire risk inference unit 260, and a decision support unit 270.

The time synchronization unit 210 functions as an NTP server or PTP server for time synchronization with the sound acquisition device 100.

According to various embodiments of the present disclosure, the time synchronization unit 210 may perform time synchronization with a separate NTP server (not shown) or a PTP server (not shown).

The audio receiving unit 220 receives the RTP packet transmitted from the sound acquisition device 100. The audio receiving unit 220 parses the received RTP packet to obtain audio data, synchronization source identifier (SSRC), time information, etc. The audio data includes acoustic signals collected by the sound acquisition device 100. The unique identifier (ID) of the sound acquisition device 100 can be confirmed through SSRC.

The audio receiving unit 220 may convert the acquired acoustic signal into an audio file and store it in the database 300. The audio receiving unit 220 may perform decoding on the encoded acoustic signal.

The preprocessing unit 230 divides the acoustic signal into a plurality of frames and obtains a spectrogram for each frame. This is to analyze the electric spark sound in the frequency domain in the fire sound analysis unit 240, which will be described later. The preprocessing unit 230 may convert a time-domain acoustic signal into a frequency-domain signal.

The preprocessing unit 230 divides the acoustic signal into time unit frames of a predetermined length. The signal is divided into short time units and converted since in converting the acoustic signal into a frequency domain signal, converting the entire signal would lose the characteristics of the signal changing over time. For example, since electric spark sounds have the characteristic of occurring in a short period of time (e.g., within 1 second), the acoustic signal may be divided into time units of seconds and may also be divided into other units of time. For example, the acoustic signal may be divided into frames of 3 seconds or more to combine the predicted probabilities in the fire risk inference unit 260, and analysis may be performed within the divided frame per a certain time unit.

In the embodiment of the present disclosure, the occurrence of electric sparks is detected by analyzing sounds generated in an underground utility tunnel to predict the occurrence of a fire. Therefore, it is necessary to convert the acoustic signals including electric spark sounds into a spectrogram suitable for the characteristics of sounds occurring in the underground utility tunnel.

Figure 4A:
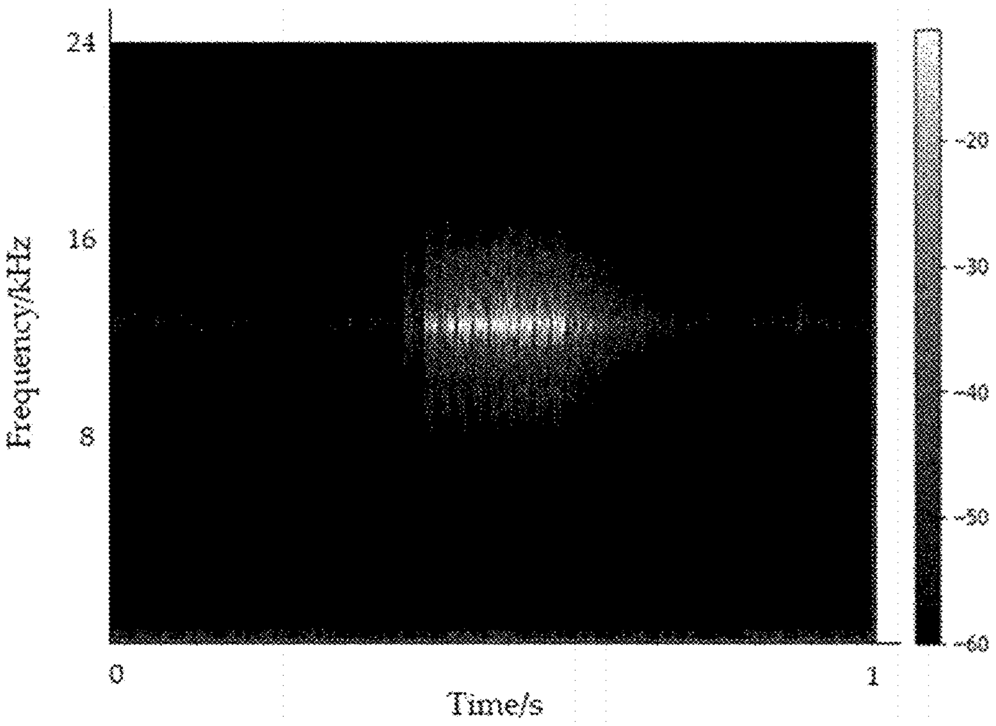
FIGS. 4A and 4B are exemplary diagrams showing a spectrogram of an electric spark sound and a spectrogram of a ventilation fan operating sound, respectively.
Figure 4B:
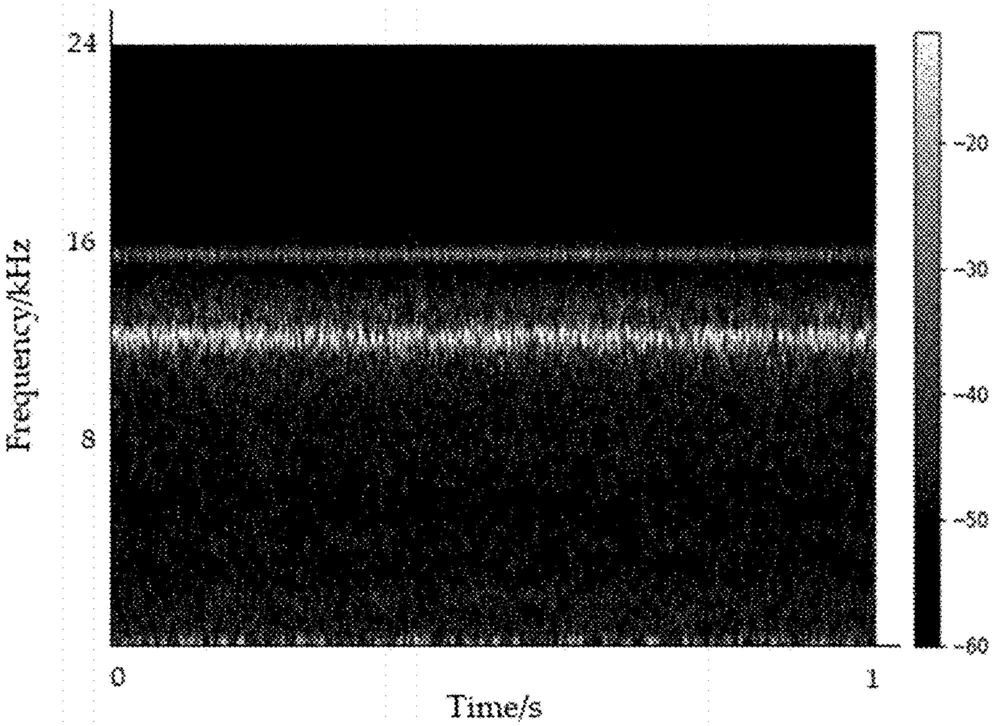

Electric spark sounds occur in a short period of time (e.g., within 1 second), and most of the energy is distributed in the frequency range of 8 kHz to 18 kHz. In addition, various noises exist in underground facilities, such as the sound of ventilation fans operating, manhole impact sounds by passing cars, and the sound of water dripping into a puddle. In particular, one of the loudest noises in underground facilities is the sound of ventilation fans operating. The ventilation fan operating sound generates energy up to the 24 kHz frequency band and is strongly concentrated below 18 kHz. The ventilation fan operating sound overlaps the frequency range of the electric spark sound and has greater energy. An example of a spectrogram of the electric spark sound is shown in FIG. 4A, and an example of a spectrogram of the ventilation fan operating sound is shown in FIG. 4B.

That is, in the sound to be analyzed in the embodiment of the present disclosure, meaningful information is concentrated in the high-frequency band rather than the low-frequency band. Therefore, it is desirable to convert the acoustic signal into a magnitude spectrogram. However, the present disclosure is not limited to this, and depending on the type of electric spark, the acoustic signal may be converted into MFCC (Mel frequency cepstral coefficients), chroma STFT (chromagram from a waveform or power spectrogram), melspectrogram (Mel-scaled power spectrogram), spectral contrast, or tonnetz (tonal centroid features), etc.

The preprocessing unit 230 converts the acoustic signal into a magnitude spectrogram using Short Time Fourier Transform (STFT). The preprocessing unit 230 may perform conversion using Equations 1 to 3.

$$X_n(e^{jw}) = \sum_{l=-\infty}^{\infty} x(l)w(n-l)e^{j\omega n} \quad \text{(Equation 1)}$$

where w(n) is a window function, that is, a Hamming window. $X_n(e^{jw})$ is a function of ω and n, $$\omega = \frac{2\pi k}{N},\ 0 \le k \le N-1,$$

N represents the number of Fast Fourier Transforms (FFT), FFT is performed for each signal, and the short-time Fourier transform is obtained as follows.

$$\begin{aligned} X_N(k) &= X_N e^{(2\pi kj/N)} \\ &= \sum_{l=-\infty}^{\infty} x(l)w(n-l)e^{-2\pi kj/N} \end{aligned} \quad \text{(Equation 2)}$$

The short-time power spectrum $Pn(e^{j\omega})$ is as follows.

$$\begin{aligned} P_n(e^{j\omega}) &= X_N(e^{j\omega})X_N(e^{j\omega}) = |X_N(e^{j\omega})|^2 \\ P_n(e^{j\omega}) &= \sum_{l=-\infty}^{\infty} R_n(k)e^{j\omega k} \\ R_n(k) &= \sum_{m=-\infty}^{\infty} x(l)w(n-l)x(l+m)w(n-l-m) \end{aligned} \quad \text{(Equation 3)}$$

where $R_n(k)$ is the short-time autocorrelation of x(n), $P_n(e^{j\omega})$ is the Fourier transform of $R_n(k)$, and n and ω are the horizontal and vertical coordinates, respectively.

The preprocessing unit 230 may perform Short Time Fourier Transform (STFT) by adjusting the window size and FFT size to satisfy time resolution and frequency resolution depending on the type of electric spark. Since sounds caused by electric sparks occur in a short period of time, it is important to increase time resolution, and since the frequency band of sounds caused by electric sparks is high at around 18 kHz, the window size and/or FFT size may be set to satisfy a frequency resolution of at least 100 Hz. For example, the preprocessing unit 230 may perform STFT with a window size of 512 using a Hamming window and 63% overlap to maintain a time resolution less than 0.01 seconds.

The fire sound analysis unit 240 receives the spectrogram from the preprocessing unit 230 and extracts a spectrogram from which noise has been removed. Since the spectrogram output from the preprocessing unit 230 includes not only the electric spark sound but also noise (e.g., the ventilation fan operating sound), this is to extract the spectrogram of only the electric spark sound with the noise removed and use it for fire situation early detection.

Generally, a system operating in the spectrogram domain uses the phase of the mixed signal when reconstructing the signal in the time domain. However, since the phase of the mixed signal is used, errors occur in the estimated signal. To address this drawback, the desired signal is directly estimated in the frequency domain without conversion to a time-domain signal.

Figure 5A:
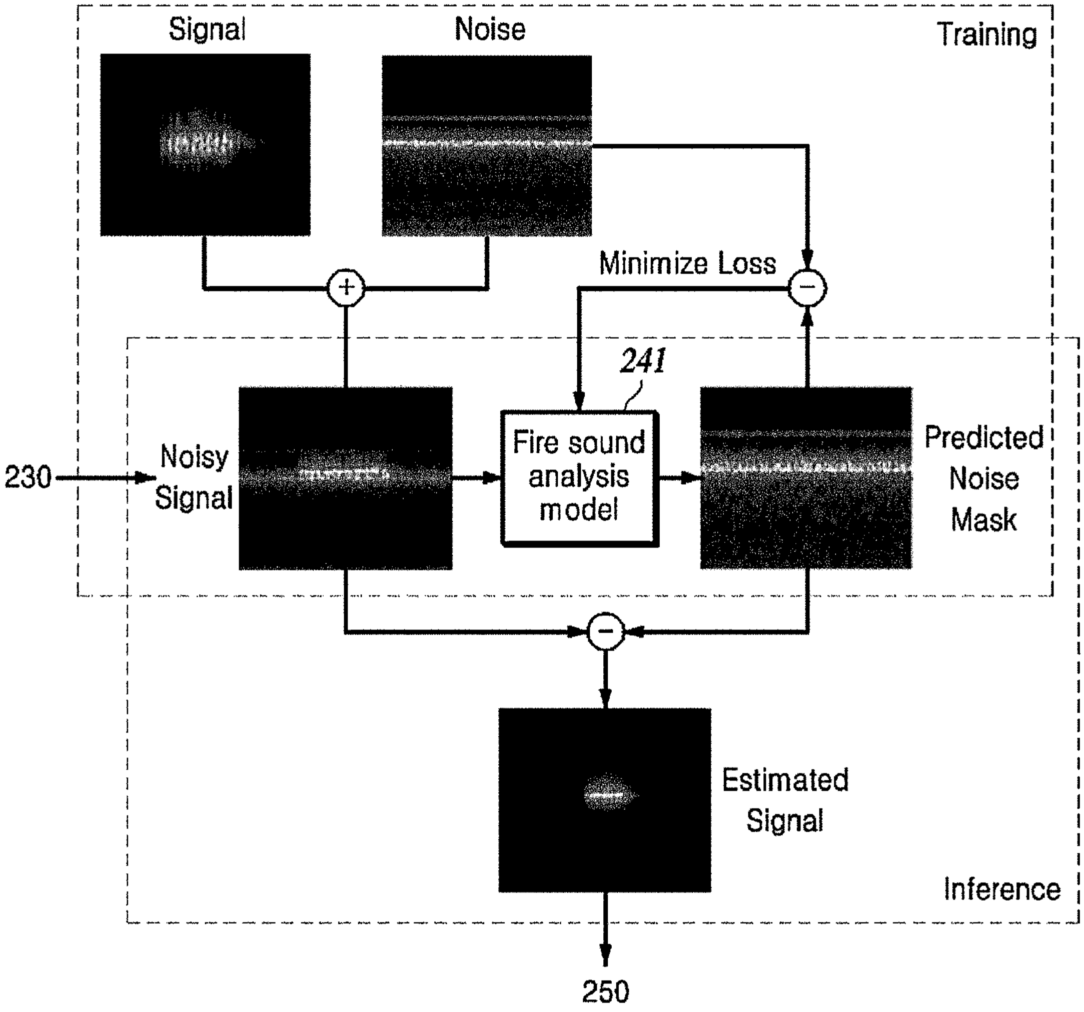
FIG. 5A is a diagram for explaining the operation of a fire sound analysis unit according to one embodiment of the present disclosure.

FIG. 5A is a diagram for explaining the operation of the fire sound analysis unit 240 according to one embodiment of the present disclosure.

Referring to FIG. 5A, the fire sound analysis unit 240 generates a noise mask from an input spectrogram that is a mixture of signal and noise using a fire sound analysis model 241, and subtracts the noise mask from the input spectrogram to estimate a spectrogram from which the noise is removed.

Figure 5B:
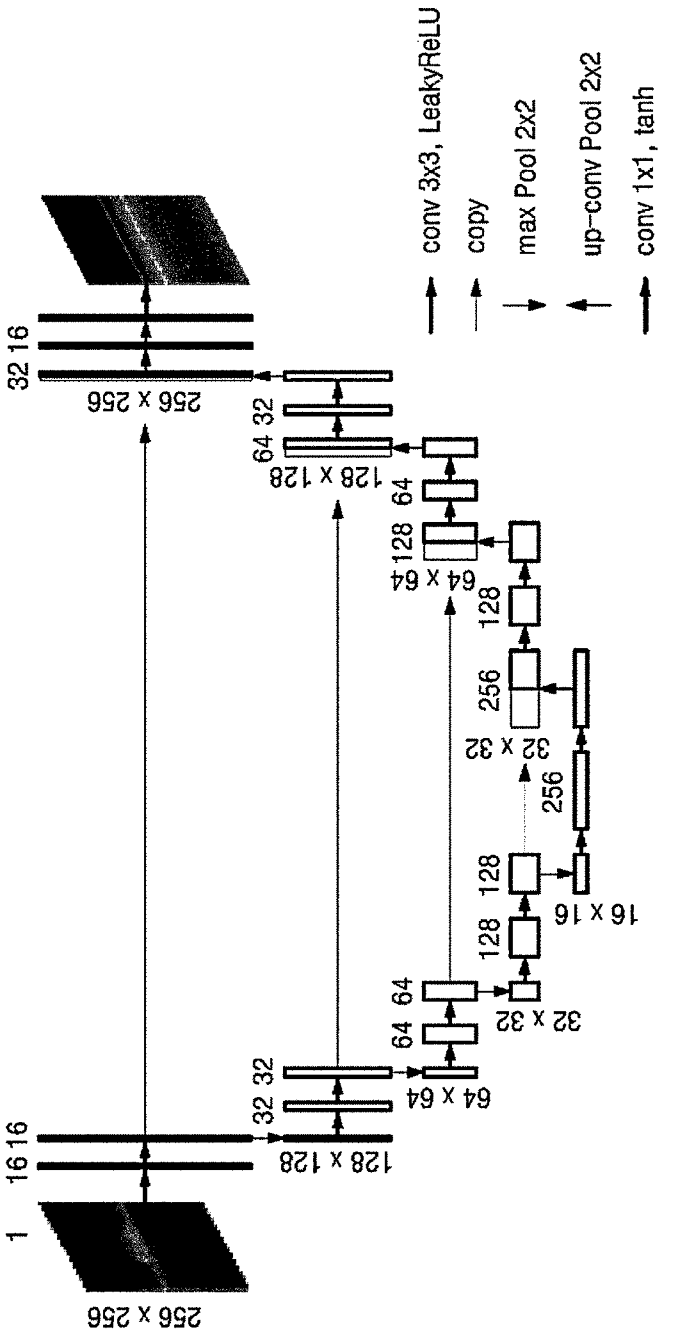
FIG. 5B is a diagram showing the architecture of a fire sound analysis model according to one embodiment of the present disclosure.

The training process of the fire sound analysis model 241 according to one embodiment of the present disclosure will be described with reference to FIGS. 5A and 5B.

The fire sound analysis model 241 is a deep learning model trained to receive a spectrogram mixed with electric spark sound and ventilation fan operation sound and output a noise mask that represents the ventilation fan operation sound, and may be implemented based on a U-net.

The fire sound analysis model 241 uses a 256×256 spectrogram of a mixed signal of electric spark sound and ventilation fan operation sound as a training dataset. All input and output matrices of the fire sound analysis model 241 are globally scaled and normalized to a distribution between −1 and 1. The encoder may be a contracting path comprised of 10 convolutional layers with the leaky rectified linear unit (LeakyReLU), max pooling, and drop-out layers. The decoder may be a symmetric expanding path with skipped connections. The final activation layer may be a hyperbolic tangent (tanh) with an output distribution between −1 and 1.

The fire sound analysis model 241 is compiled using the Adam (Adaptive Moment Estimation) optimizer, and the loss function may be used as a trade-off between $$L_{L1}(y, y^p_{TNR}) = \sum_i |y_i - y^p_{TNR,i}| \text{ and } L_{SquaredL2} = \sum_i |y_i - y^p_{TNR,i}|^2,$$

where y is the actual value, $$y^p_{TNR}$$

is the predicted value through the fire sound analysis model, and $y_i$ represents the i-th item of y.

Due to the strong noise characteristics of ventilation fans, several outliers may exist in the signal. To compensate for this, a robust loss function resistant to outliers may be used. For example, the Huber loss function in Equation 4 and the log-cosh loss function in Equation 5 may be used.

$$L_{huber}(y, y^p_{TNR}) = \begin{cases} \frac{1}{2}(y, y^p_{TNR})^2, & \text{for } |y - y^p_{TNR}| \le 1 \\ |y - y^p_{TNR}| - \frac{1}{2}, & \text{otherwise} \end{cases} . \quad \text{(Equation 4)}$$

$$L_{cash}(y, y^p_{TNR}) = \sum_{i=1}^{n} \log(\cosh(y^p_{i,TNR} - y_i)) \quad \text{(Equation 5)}$$

The Huber loss function has the characteristic of compensating for the drawbacks of a non-differentiable L1 loss by applying L2 loss when the error is less than or equal to 1, and complementing for the drawbacks of L2 loss that is sensitive to outliers by applying L1 loss when the error is greater than 1. The use of the Huber loss function during the training of the fire sound analysis model 241 ensures rapid learning even when large errors occur. Using the robust L1 loss at the early stages of the training process when the fire sound analysis model 241 could converge may be effective.

As the training has progressed to a certain extent and the value of the loss function becomes less than 1, stable training may be achieved by using the differentiable L2 loss.

The log-cosh loss function combines the advantages of mean squared error (MSE) and mean absolute error (MAE), reduces sensitivity to outliers, and improves the robustness of neural network models to outliers.

The fire sound analysis unit 240 uses the trained fire sound analysis model 241 to obtain a noise mask that represents the ventilation fan operating sound from the input spectrogram that is a mixture of the electric spark sound and the ventilation fan operating sound, and subtracts the noise mask from the input spectrogram to estimate a signal from which the noise is removed.

The pre-fire situation detection unit 250 receives the estimated spectrogram from the fire sound analysis unit 240 and predicts occurrence of an electric spark event.

The electric spark signal has more prominent local characteristics in the frequency domain than temporal correlation. Since the estimated electric spark signal output through the fire sound analysis unit 240 is transformed data with noise suppressed, it is important to reflect the transformed frequency characteristics. Therefore, the pre-fire situation detection unit 250 uses a 2D CNN (2 Dimensional Convolutional Neural Network) structure to capture the local characteristics of the estimated electric spark signal from the fire sound analysis unit 240, receives the spectrogram output from the fire sound analysis unit 240, and finally calculates the predicted probability of the occurrence of an electric spark event.

The pre-fire situation detection unit 250 uses the pre-fire situation detection model 251 to calculate a predicted probability of the occurrence of an electric spark event from the spectrogram estimated by the fire sound analysis unit 240.

Figure 6:
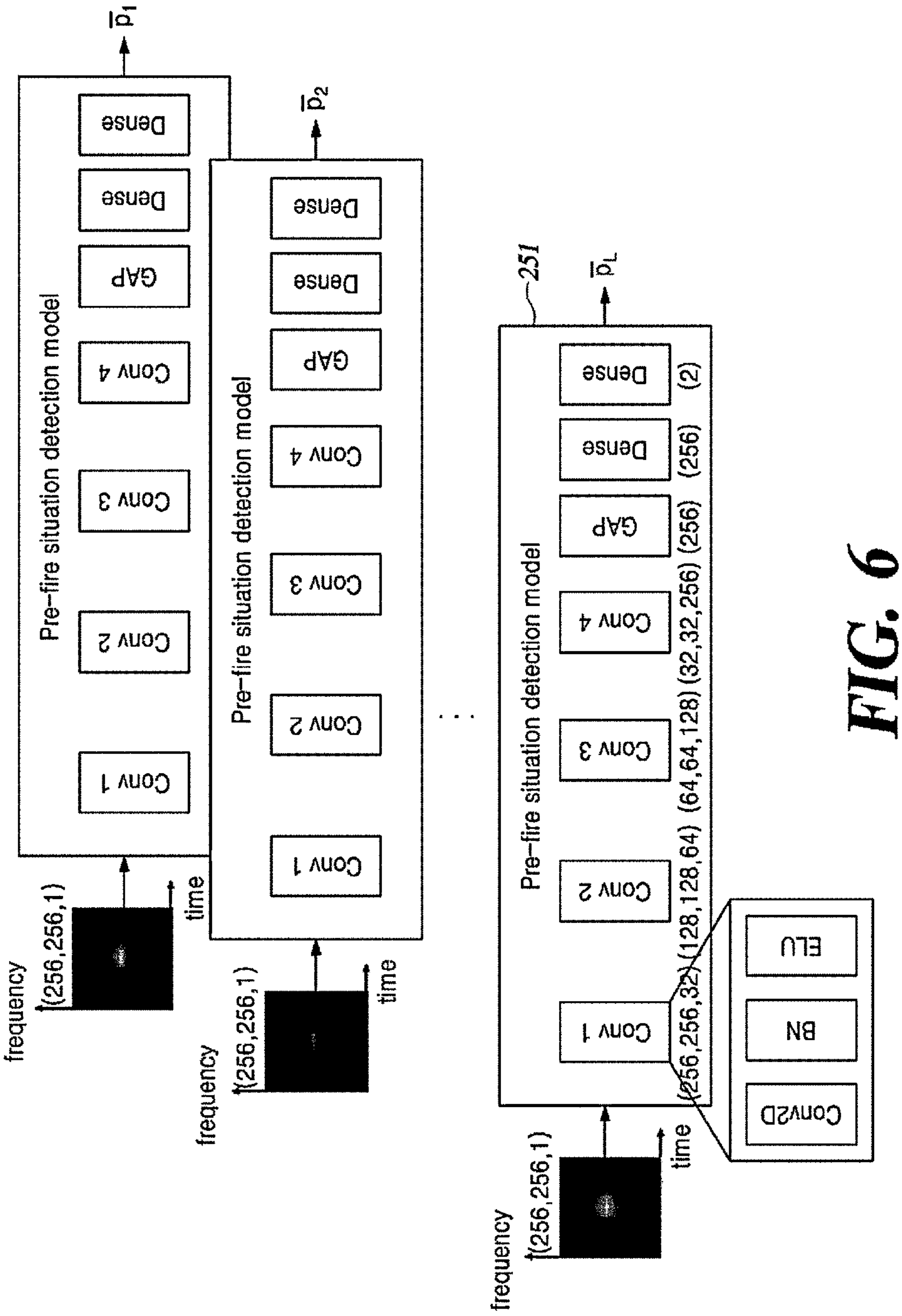
FIG. 6 is a diagram showing the architecture of a pre-fire situation detection model according to one embodiment of the present disclosure.

FIG. 6 is a diagram showing the architecture of the pre-fire situation detection model 251 according to one embodiment of the present disclosure. Referring to FIG. 6, the pre-fire situation detection model 251 may be implemented based on a 2D CNN. The pre-fire situation detection model 251 may comprise four 2D convolutional layers, one global average pooling (GAP) layer, and two fully connected layers (dense layers). The kernel size of each 2D convolutional layer may be set to [3, 3] with the same padding. Strides may be set to 1 only for Conv 1, and set to 2 for Convs 2 to 4. Batch normalization (BN) may be applied to each convolutional layer, and then ELU (exponential linear unit) may be used as an activation function. After four convolutional layers (Convs 1 to 4), global average pooling (GAP) may be used to make the model lightweight and prevent overfitting. In general, the global average pooling (GAP) is used for extracting the features of each sample by repeatedly performing average pooling to reduce the size of the sample and extract representative values of [1, 1] filter size from each sample. Therefore, a sample of size [32×32, 256] in Conv 4 is represented using a layer of size with 256 representative values. Then, the predicted probability is calculated using softmax as the activation function through two fully connected layers (dense layers).

The fire risk inference unit 260 infers the fire risk by combining the predicted probabilities calculated by the pre-fire situation detection unit 250. The fire risk inference unit 260 may analyze the fire risk by combining the predicted probabilities obtained using the pre-fire situation detection model 251 based on the frame length. The fire risk inference unit 260 may divide frames into units of 3 seconds or more to combine the predicted probability derived from the pre-fire situation detection unit 250. The combination result $P_f=(\overline{p}_1, \ldots \overline{p}_C)$ may be obtained as Equation 6.

$$\overline{p}_L = \frac{1}{L}\sum_{l=1}^{L}\overline{p}_{lc}, \text{ for } 1 \le l \le L \quad \text{(Equation 6)}$$

where $\overline{P}_L=(\hat{p}_{l1}, \ldots \overline{p}_{lC})$ denotes the predicted probability of one-dimensional time domain data of 1 second, and C indicates the category number, and $1^{th}$ is evaluated considering L frames.

The number of categories according to the embodiment of the present disclosure may be two depending on whether an electric spark occurs, but is not limited thereto. For example, the value of C may vary depending on the number of categories. The aggregated prediction label ŷ is as shown in Equation 7. In this case, when the value of the prediction label is 0, it means a normal situation, and when the value of the prediction label is 1, it means an abnormal situation.

$$\hat{y} = \text{argmax}(\overline{p}_1, \ldots \overline{p}_L) \quad \text{(Equation 7)}$$

Figure 7:
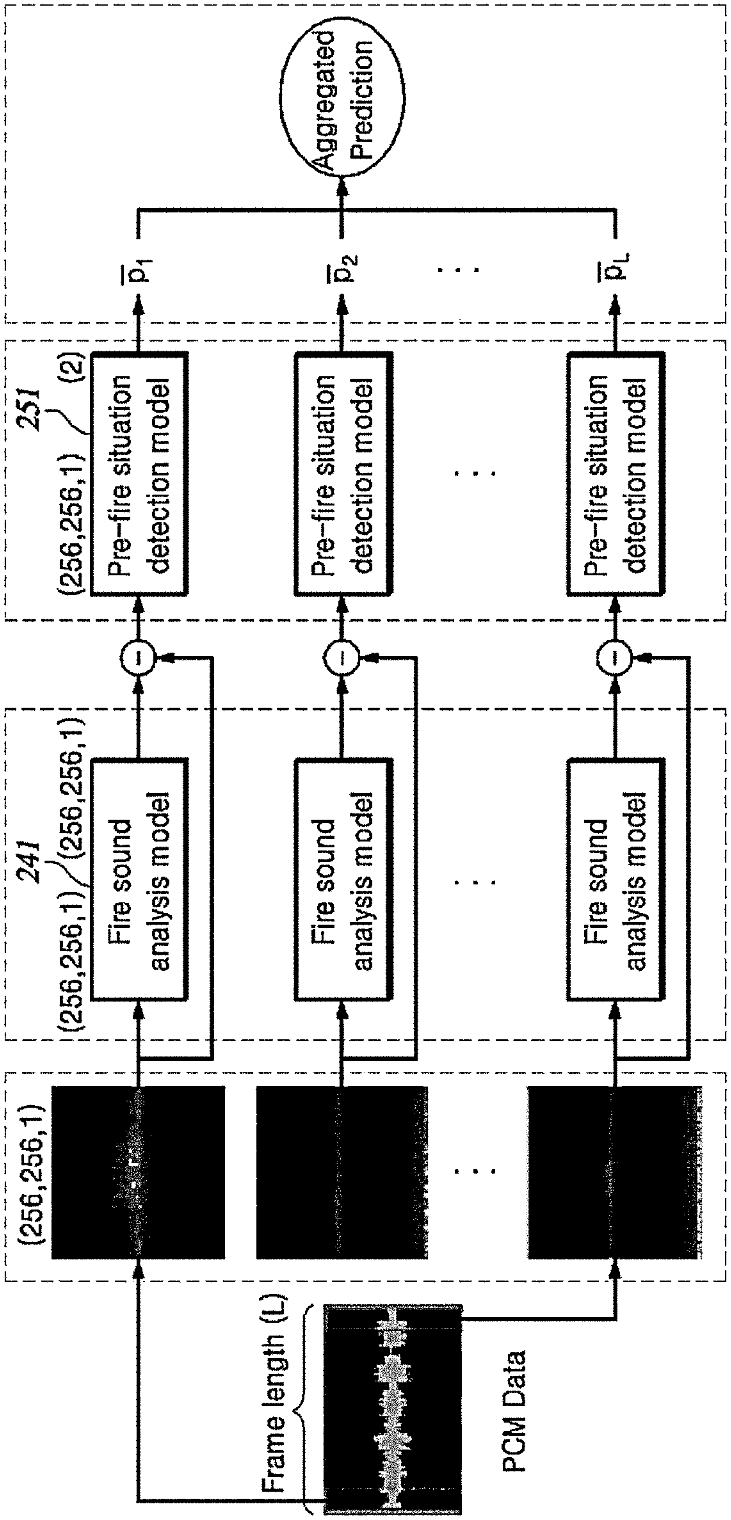
FIG. 7 is a diagram showing a process of predicting a probability of a fire occurrence from an acoustic signal received by the fire situation early detection server according to one embodiment of the present disclosure.

The flow of predicting a probability of a fire occurrence from the acoustic signal received by the fire situation early detection server 200 according to one embodiment of the present disclosure is shown in FIG. 7.

Figure 8:
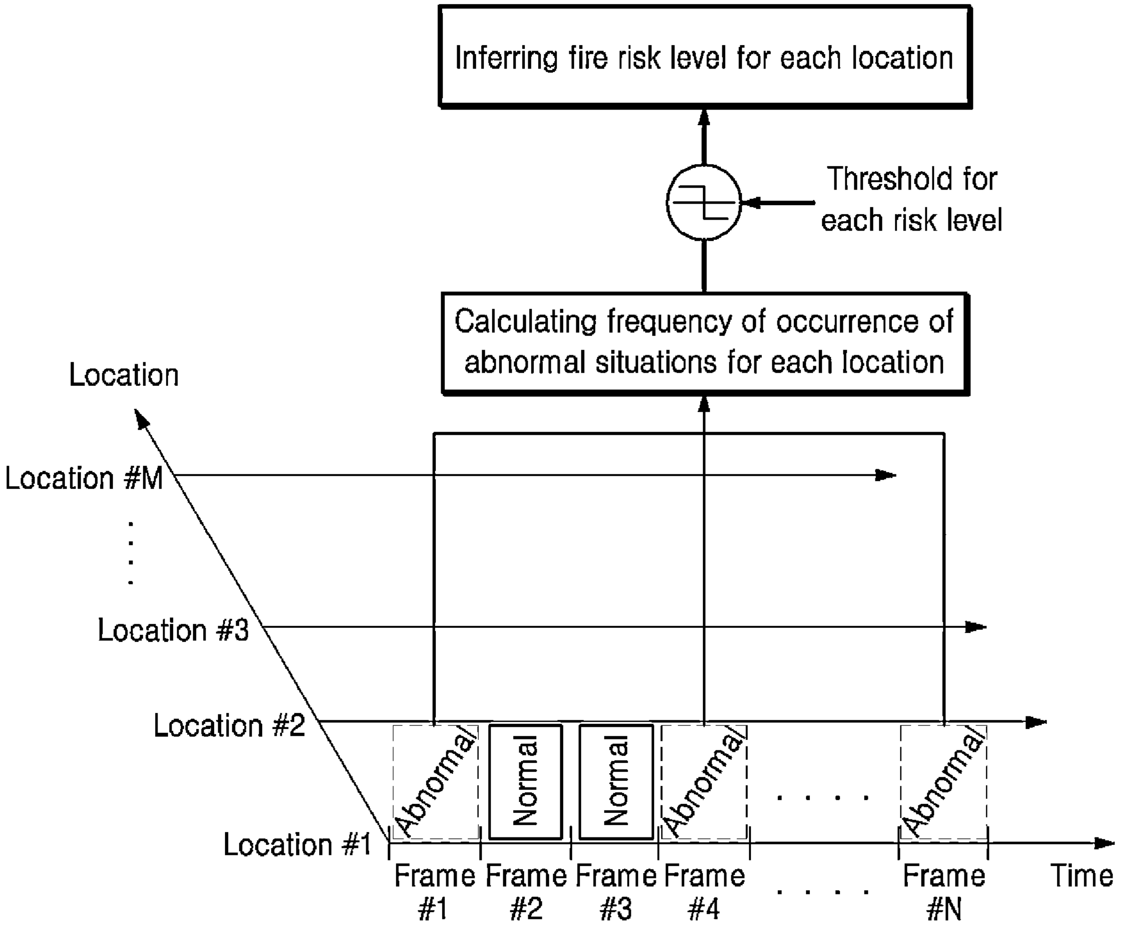
FIG. 8 is a diagram for explaining a process in which the fire situation early detection server according to one embodiment of the present disclosure infers a fire risk level for each location where the sound acquisition device is installed.

The fire risk inference unit 260 may infer a fire risk according to the value of the aggregated prediction label. Referring to FIG. 8, the fire risk inference unit 260 may calculate the frequency of frames in which an abnormal situation occurs within a predetermined number of frames (for example, N number of frames) for each location, and apply a threshold for each risk level to the calculated frequency to infer a fire risk level for each location. In this case, the location refers to the installation location of each sound acquisition device 100 that is confirmed using the SSRC included in the RTP packet transmitted from the corresponding sound acquisition device 100. FIG. 8 shows a process of inferring the risk level based on the frequency of frames in which an abnormal situation occurs at the installation location of the first sound acquisition device 100, but the same process is also performed at other locations. In various embodiments of the present disclosure, the fire risk level for each location may be inferred by considering not only the frequency of abnormal situations but also whether they occur continuously.

The inference result of the fire risk inference unit 260 may be transmitted to the fire safety monitoring device 400. The inference result of the fire risk inference unit 260 may be stored in the database 300 together with the audio file transmitted from the preprocessing unit 230.

Figure 9:
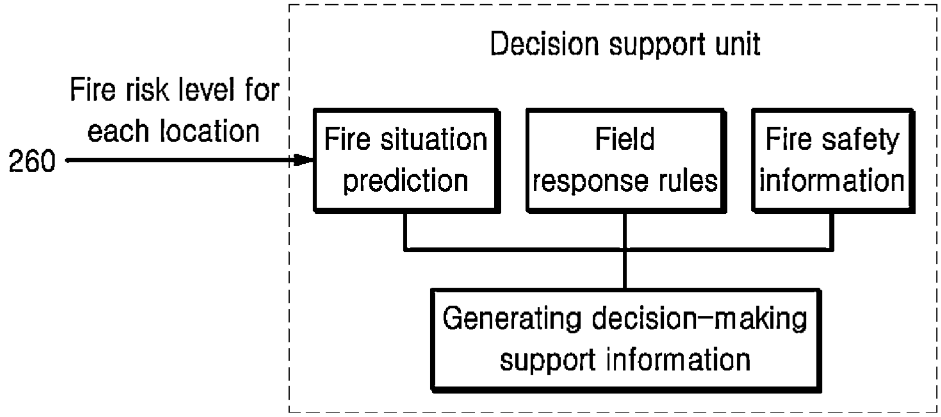
FIG. 9 is a diagram for explaining the operation of a decision support unit according to one embodiment of the present disclosure.

The decision support unit 270 may generate decision-making support information by considering various contextual information about the fire situation. Referring to FIG. 9, the decision support unit 270 may analyze fire risk level data for each location received from the fire risk inference unit 260 to perform a fire situation prediction to be used for decision-making support. For example, the fire situation prediction may include predicting where the current fire occurred and a severity level thereof based on fire risk level and location, and decision-making support information may be generated in conjunction with field response rules and fire safety information depending on the level of the fire situation prediction. In this case, the fire safety information may include firefighting facility information, evacuation route and backup route information, firefighting activity plan information, firefighting inspection result information, etc. Further, the field response rules may be derived based on standard operating procedures and field management manuals.

The decision-making support information may be specified in a rule engine language. The specification is generated in the form of defining a procedure to be executed when a specific condition is met, and the procedure may be defined by referring to the fire risk inference unit 260 and the condition. For example, in the process of generating decision-making support information, a fire situation prediction instance may be defined according to the fire situation and possible decision-making support information may be derived. The value of the fire situation prediction instance may be automatically set from the fire safety information of the fire-fighting object in which a fire occurs. The rule engine may execute the field response rule specification for the fire situation prediction instance and output the response procedure as a result.

The database 300 stores and manages various data generated and used in the fire situation early detection system. For example, the database 300 may store the acoustic signal received from the sound acquisition device 100 and converted to an audio file. For example, the database 300 stores fire risk inference results. For example, the database 300 may store decision-making support information generated by the decision support unit 270. The database 300 may manage information about the sound acquisition device 100 installed in an underground facility. For example, the database 300 may manage information about the location where the sound acquisition device is installed, the unique identifier of the sound acquisition device, and the like. The database 300 may manage fire safety information, field response rules, and the like.

The fire safety monitoring device 400 may check the installation location of the sound acquisition device 100 by using the SSRC of the data transmitted from the sound acquisition device 100, and may monitor locations with increased fire risk based on the inference result of the fire risk inference unit 260. The fire safety monitoring device 400 may check decision-making support information generated by the decision support unit 270. The fire safety monitoring device 400 may check the sound in real time through the sound data transmitted from the preprocessing unit 230, and may retrieve and check the fire event detection sound stored in the database 300.

The fire safety monitoring device 400 may include, but is not limited to, a terminal such as a PC, a mobile phone, and a tablet of a manager who monitors, manages, and maintains the underground facility.

The performance evaluation results of the fire sound analysis model 241 and the pre-fire situation detection model 251 are explained. To evaluate the efficiency of the proposed model, the commonly used source-to-distortion ratio (SDR) is considered as a training target and evaluation metric. Furthermore, accuracy, precision, recall, and F1-Score are also considered as performance evaluation metrics. All these evaluation metrics are calculated from various attributes within the confusion matrix, where TP (True Positive) and TN (True Negative) denote the correctly predicted abnormal and normal instances, respectively, and FN (False Negative) and FP (False Positive) represent the incorrectly predicted instances of normality and anomaly, respectively.

First, the results of evaluating and comparing the average SDR improvement for the fire sound analysis model 241 using different loss functions are listed in Table 1.

TABLE 1

| | | SNR | | | | | |
|---|---|---|---|---|---|---|---|
| | | −20 dB | −10 dB | −5 dB | 0 dB | 5 dB | 10 dB |
| SDR | L1 loss | −15.93 | −5.42 | −0.15 | 4.1 | 7.31 | 10.08 |
| | L2 loss | −17.1 | −3.09 | 1.23 | 4.89 | 8.04 | 10.98 |
| | Huber loss | −19.74 | −8.34 | −0.15 | 5.28 | 8.39 | 11.07 |
| | cosh loss | −12.93 | −2.81 | 1.24 | 4.87 | 8.01 | 10.41 |

As shown in Table 1, according to the experimental results, the best loss function was the log-cosh loss for SNRs below 0 dB, whereas the Huber loss was more effective for SNRs of 0 dB or higher. Although log-cosh loss estimated the spectrum of electric sparks relatively well even at low SNRs, residual noise remained. Therefore, SDR of the log-cosh loss was lower than that of the Huber loss for 0 dB or higher SNRs, where the electric spark spectrum is revealed. In the case of L1 loss, the performance is lower than log-cosh loss, and in the case of L2 loss, performance is similar to log-cosh loss for 0 dB or higher SNRs. As the log-cosh loss was less sensitive to outliers, its performance was relatively high in low SNRs, but it was more sensitive to small errors. Thus, the prediction performance of L2 loss was relatively high for SNRs of 0 dB or higher compared to log-cosh loss. The Huber loss effectively suppressed residual noise at high SNRs, resulting in a higher SDR in comparison with that of log-cosh loss. When the SNR is low, the spectrum of some strong regions is estimated, but the remaining part is not well separated from the mixture spectrum, so Huber loss has a lower SDR compared to log-cosh loss. Therefore, in the case of low SNRs in environments such as underground utility tunnels, log-cosh loss and L2 loss are advantageous, and L2 loss is suitable as a loss function for the fire sound analysis model 241 when compared in terms of the overall performance.

To evaluate the performance of the pre-fire situation detection model 251, the results of comparing the three baseline models are listed in Table 2.

TABLE 2

| Model | Precision | Recall | F1-score | Accuracy |
|---|---|---|---|---|
| Fire sound analysis model + Pre-fire situation detection model (CNN) | 0.8953 | 0.9976 | 0.9436 | 0.9631 |
| Fire sound analysis model + Pre-fire situation detection model (RNN) | 0.5846 | 0.9134 | 0.7129 | 0.7934 |
| Fire sound analysis model + Pre-fire situation detection model (LSTM) | 0.9757 | 0.7357 | 0.8389 | 0.8355 |

As shown in Table 2, it can be observed that, in most cases, the fire sound analysis model+pre-fire situation detection model (CNN) obtains the best results. The overall accuracy is 96.31%, the precision of electric spark event detection is 89.53%, the recall is 99.76%, and the F1-score is 94.36%. This indicates that local characteristics can capture the internal characteristics of abnormal and normal sounds. The better performance of the fire sound analysis model+pre-fire situation detection model (CNN) shows that the local characteristics of the spectrogram are important for detecting electrical spark events. In addition, the poor results of RNN and LSTM may be due to the fact that these methods only consider information from past datasets and sequential information of the spectrogram and do not reflect the characteristics of noise-suppressed data output through the fire sound analysis model. The experimental results indicate that a microphone sensor can analyze the sound generated in UUTs and detect electric sparks, thereby contributing to the implementation of an intelligent fire detection system. The experimental results verify that the proposed method can stably detect electric spark sounds by eliminating the ventilation fan noise, which can have a significant impact on the UUTs.

At least some of the components described in the exemplary embodiments of the present disclosure may be implemented as hardware elements including at least one or a combination of a digital signal processor (DSP), a processor, a controller, an application-specific IC (ASIC), a programmable logic device (FPGA, etc.), and other electronic devices. In addition, at least some of the functions or processes described in the exemplary embodiments may be implemented as software, and the software may be stored in a recording medium. At least some of the components, functions, and processes described in the exemplary embodiments of the present disclosure may be implemented through a combination of hardware and software.

The methods according to the exemplary embodiments of the present disclosure may be written as a program that can be executed on a computer, and may also be implemented in various recording mediums such as a magnetic storage medium, an optical read medium, and a digital storage medium.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by, or controlling the operation of a data processing device, e.g., a programmable processor, a computer, or multiple computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be processed on one computer or multiple computers at one site or distributed across multiple sites and developed to be interconnected through a communications network.

Processors suitable for processing computer programs include, by way of example, both general-purpose and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as CD-ROM (Compact Disk Read Only Memory), DVD (Digital Video Disk), magneto-optical mediums such as floptical disk, ROM (Read Only Memory), RAM (Random Access Memory), flash memory, EPROM (Erasable Programmable ROM), and EEPROM (Electrically Erasable Programmable ROM). The processor and memory may be supplemented by or included in special purpose logic circuitry.

The processor may execute an operating system and software applications executed on the operating system. In addition, the processor device may access, store, manipulate, process, and generate data in response to the execution of software. For ease of understanding, the processor device may be described as being used as a single processor device, but those skilled in the art will understand that the processor device may include a plurality of processing elements and/or a plurality of types of processing elements. For example, a processor device may include a plurality of processors or one processor, and one controller. Further, other processing configurations, such as parallel processors, are also possible.

In addition, a non-transitory computer-readable medium may be any available medium that can be accessed by a computer and may include both a computer storage medium and a transmission medium.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A system for early detection of fire situations in an underground facility based on sound, the system comprising:

a sound acquisition device that is installed in the underground facility and collects acoustic signals in real time; and a fire situation early detection server that predicts occurrence of electric sparks and infers a fire risk based on the acoustic signal collected by the sound acquisition device, wherein the fire situation early detection server includes:

an audio receiving unit configured to receive the acoustic signals collected from the sound acquisition device;

a preprocessing unit configured to divide the received acoustic signals into a plurality of frames and obtain a spectrogram for each of the plurality of frames;

a fire sound analysis unit configured to extract noise-removed data from the obtained spectrogram for each of the plurality of frames;

a pre-fire situation detection unit configured to predict, for each of the plurality of frames, a probability of electric spark occurrence based on the extracted noise-removed data; and a fire risk inference unit configured to infer the fire risk by combining predicted probabilities of electric spark occurrence in each frame;

wherein the underground facility includes at least one of an underground tunnel or facility containing equipment, wherein ventilation fan operation generates environmental noise, wherein the fire sound analysis unit is configured to generate a noise mask from the obtained spectrogram using a fire sound analysis model, and extract the noise-removed data by subtracting the generated noise mask from the obtained spectrogram, wherein the sound acquisition device comprises an audio acquisition unit configured to collect acoustic signals in real time through an acoustic sensor, wherein the fire situation early detection server further comprises a decision support unit configured to perform fire situation prediction and generate decision-making support information, and wherein the decision support unit is configured to predict a fire situation based on an inferred fire risk level calculated for the acoustic sensor.

2. The system of claim 1, wherein the acoustic sensor includes a microphone and the sound acquisition device further comprises:

an audio compression unit configured to compress the collected acoustic signals; and an audio transmission unit configured to transmit the compressed acoustic signals to the fire situation early detection server.

3. The system of claim 2, wherein the audio transmission unit is configured to transmit time information and identifier information of the sound acquisition device together when transmitting the compressed acoustic signals.

4. The system of claim 2, wherein the sound acquisition device further comprises a time synchronization unit configured to perform time synchronization with at least one of the fire situation early detection server or other sound acquisition devices.

5. The system of claim 1, wherein the audio receiving unit is configured to convert the received acoustic signals into an audio file and store the audio file in a database.

6. The system of claim 1, wherein the preprocessing unit is configured to divide the received acoustic signals into a plurality of frames having a predetermined length of time, and obtain the spectrogram or a log power spectrogram for each of the plurality of frames.

7. The system of claim 1, wherein the fire sound analysis model is an artificial neural network model trained to generate a noise mask from a spectrogram that is a mixture of signal and noise.

8. The system of claim 1, wherein the fire sound analysis model is an artificial neural network model trained to generate a noise mask from a spectrogram that is a mixture of electric spark signal and noise.

9. The system of claim 1, wherein the pre-fire situation detection unit is configured to predict the probability of electric spark occurrence from the noise-removed data extracted by the fire sound analysis unit using a pre-fire situation detection model.

10. The system of claim 9, wherein the pre-fire situation detection model is a convolutional neural network (CNN) model trained to predict the probability of electric spark occurrence from an input spectrogram.

11. The system of claim 1, wherein the fire risk inference unit is configured to infer the fire risk by combining predicted electric spark occurrence probabilities for respective frames at preset time intervals.

12. The system of claim 1, wherein the fire risk inference unit is configured to calculate a frequency of frames in which an electric spark is predicted to occur within a predetermined number of frames, and infer the fire risk level by applying a threshold value for each of risk levels to the calculated frequency.

13. The system of claim 1, wherein the decision support unit is further configured to predict the fire situation based on a location of a corresponding sound acquisition device, and provide the decision-making support information in connection with field response rules and fire safety information based on the location and the predicted fire situation.

14. A method for early detection of fire situations in an underground facility based on sound, the method comprising:

collecting, by at least one sound acquisition device installed in an underground facility, acoustic signals in real time, and transmitting the collected acoustic signals to a fire situation early detection server;

dividing, by the fire situation early detection server, the received acoustic signals into a plurality of frames, and obtaining a spectrogram for each of the plurality of frames;

extracting, by the fire situation early detection server, data from which noise has been removed from the spectrogram for each of the plurality of frames;

predicting, by the fire situation early detection server, for each of the plurality of frames, a probability of electric spark occurrence based on the extracted noise-removed data; and inferring, by the fire situation early detection server, a fire risk by combining predicted probabilities of electric spark occurrence in each frame, wherein the underground facility includes at least one of an underground tunnel or facility containing equipment, wherein ventilation fan operation generates environmental noise, wherein the at least one sound acquisition device comprises an acoustic sensor, and wherein the method further includes generating a noise mask from the obtained spectrogram using a fire sound analysis model, and extracting the noise-removed data by subtracting the generated noise mask from the obtained spectrogram, and predicting a fire situation based on an inferred fire risk level calculated for the at least one acoustic sensor.

* * * * *